June 10, 1930.  R. B. LEWIS  1,763,400
TESTING MACHINE
Filed Oct. 8, 1924  5 Sheets-Sheet 1

Inventor-
Robert B. Lewis.
by his Attorneys.

June 10, 1930.   R. B. LEWIS   1,763,400
TESTING MACHINE
Filed Oct. 8, 1924   5 Sheets-Sheet 5
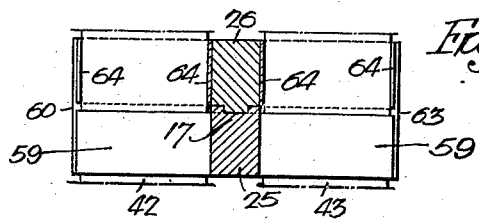
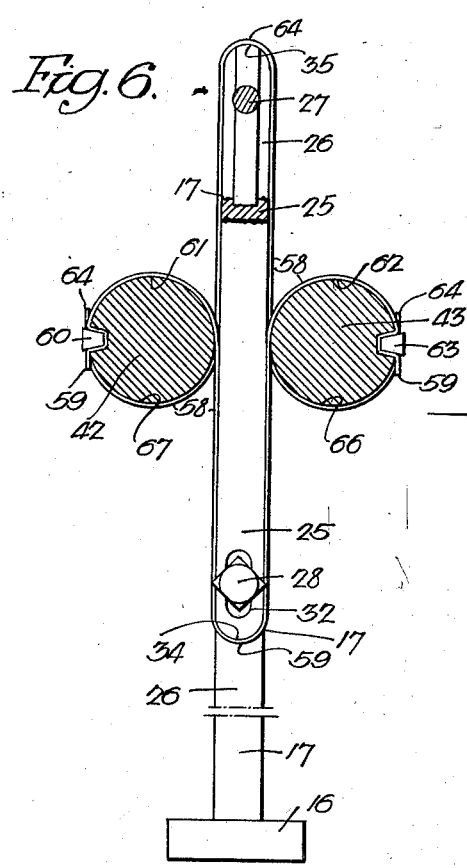
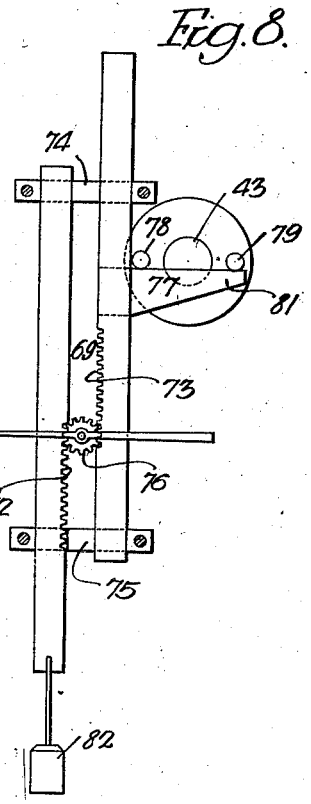
Inventor—
Robert B. Lewis.
by his Attorneys.—
Howson & Howson Patented June 10, 1930

1,763,400

UNITED STATES PATENT OFFICE

ROBERT B. LEWIS, OF PHILADELPHIA, PENNSYLVANIA, ASSIGNOR TO TINIUS OLSEN TESTING MACHINE COMPANY, OF PHILADELPHIA, PENNSYLVANIA, A CORPORATION OF PENNSYLVANIA

TESTING MACHINE

Application filed October 8, 1924. Serial No. 742,419.

My invention relates to that class of devices for measuring the deflection or distortion of a body, such as a spring when a given load is applied thereto, and one object of my invention is to provide such a machine which shall be simple, durable, accurate and convenient to manipulate.

Another object of my invention is to provide a testing machine of the above type, which shall include weighing elements in the form of pendulums mounted to permit either a negative or a positive application of load, that is to allow a specimen being placed in tension or in compression, at will.

My invention also includes a novel form of indicating mechanism which is operatively associated with said weighing elements in such manner that the indicating elements shall be deflected in the same direction for tension and compression loads, though it may well be designed for deflection in opposite directions upon the application of the several types of loads.

A further object of the invention is to provide a testing machine which shall include one or more pendulums together with a device for showing the load applied to a test specimen by indicating the deflection of the pendulum from its normal position, the construction being such as to permit of the use of an indicating instrument having a uniformly divided scale.

I also desire to provide novel means for operatively connecting a load-applying pendulum with an indicating instrument, whereby the sine-curve motion of the pendulum may be transformed into a uniform movement of an indicator.

These objects and other advantageous ends I attain as hereinafter set forth, reference being had to the accompanying drawings, in which, Figs. 1 and 2 are respectively a front and a side elevation of a testing machine constructed in accordance with my invention;

Fig. 6 is a fragmentary vertical section on the line 6—6 of Fig. 4;

Fig. 7 is a horizontal fragmentary section on the line 7—7 of Fig. 3; and,

Fig. 8 is a front elevation partly in section illustrating the connection between one of the pendulum shafts and the indicator.

Figure 1:
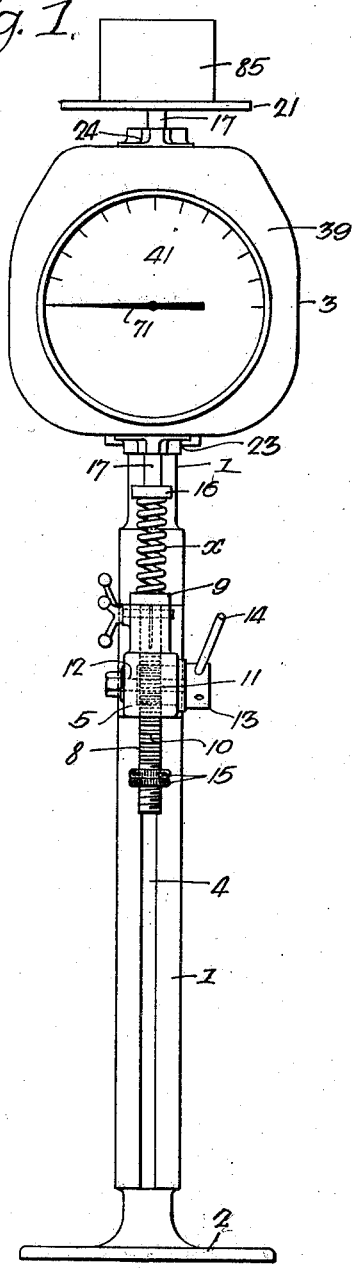

In the above drawings, 1 represents a vertically extending column or standard having a base 2 and at its upper end a casing 3. The standard 1 is preferably hollow and in any event has a slot 4 extending from a point near its basal end to a point adjacent the casing 3. A front face of said standard is plane and on it is vertically slidable a crosshead 5 which has a stem 6 extending through the slot 4 provided with a hand-nut 7 in its rear end, whereby said cross-head 5 may be rigidly clamped to the front face of the standard 1 in any given position.

Within the cross-head 5 is slidably mounted a bar or rod 8 having on its upper end a specimen-engaging platen or other suitable device 9 and formed with a toothed portion 10 constituting a rack engaged by a pinion 11 rotatably mounted within a suitable hollow of the cross-head 5 on a shaft 12. The latter projects to one side of the cross-head 5 where it is provided with an enlarged head portion in which is disposed any desired number of radially formed holes 13 designed for the reception of an operating bar 14.

The lower extremity of the platen-carrying rod 8 is threaded for the reception of a pair of nuts 15 which serve to limit its upward movement. By loosening the nut 7, it is obvious that the cross-head 5 may be conveniently positioned on the standard 1 with a view to bringing its platen 9 into operative engagement with an object to be tested. Thereafter the rotation of the pinion 11 causes the bar 8 to move vertically in the cross-head 5 and, through the platen 9, apply any desired load to an object, such for example, as a spring $x$.

The upper end of the spring $x$ may be engaged by a platen 16 detachably mounted on a lower end of a plunger 17 which extends vertically into the casing 3 through a perforation 18 in the base portion thereof, an upper end of the plunger 17 projecting through a perforation 19 in the upper portion of the casing 3 and terminating in a weight-supporting platen 21, for reasons as will appear more fully hereinafter. The lower and upper end portions of the plunger 17 extending through the walls of the casing 3 may be guided by anti-friction wheels 22 which are supported by bracket members 23 and 24, respectively.

Figure 4:
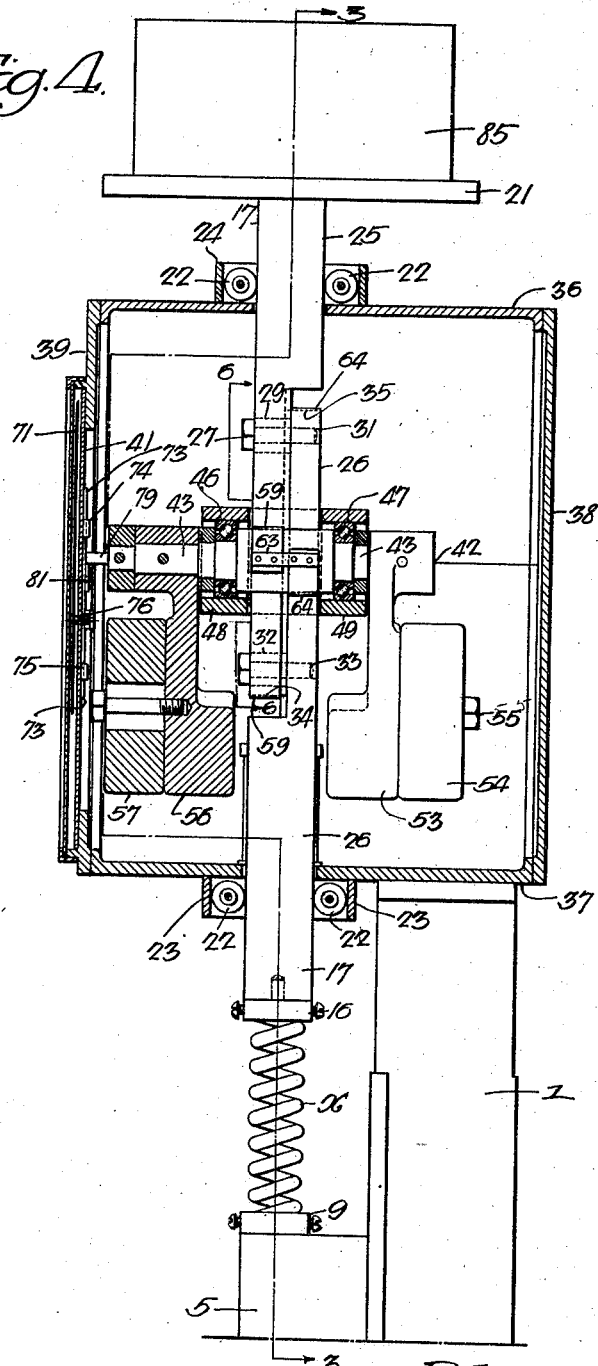
Fig. 4 is a vertical section on the line 4—4 of Fig. 5.
Figure 5:
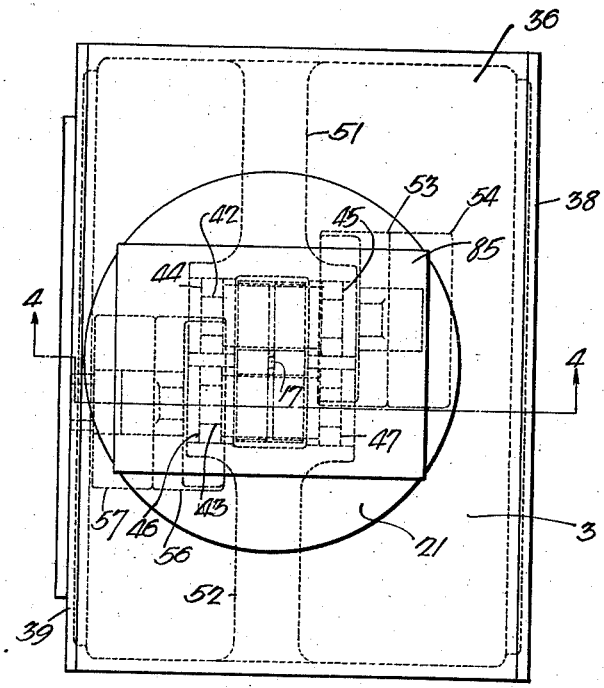
Fig. 5 is a top plan view of the structure of Fig. 4.

The plunger 17 may comprise upper and lower sections 25 and 26, adjacent ends of which are recessed and secured in over-lapping engagement by bolts 27 and 28, as shown in Fig. 4 of the drawing. The bolt 27 extends through a vertical slot 29 in the upper plunger section 25 into a threaded perforation 31 formed in the lower plunger section 26. The bolt 28 on the other hand extends through a slotted portion 32 in the upper plunger section 25 into engagement with a threaded perforation 33 formed in the lower plunger section 26, whereby the relative spacing of shoulders 34 and 35 representing the lower and upper ends, respectively, of the plunger sections 25 and 26 may be adjusted.

Figure 3:
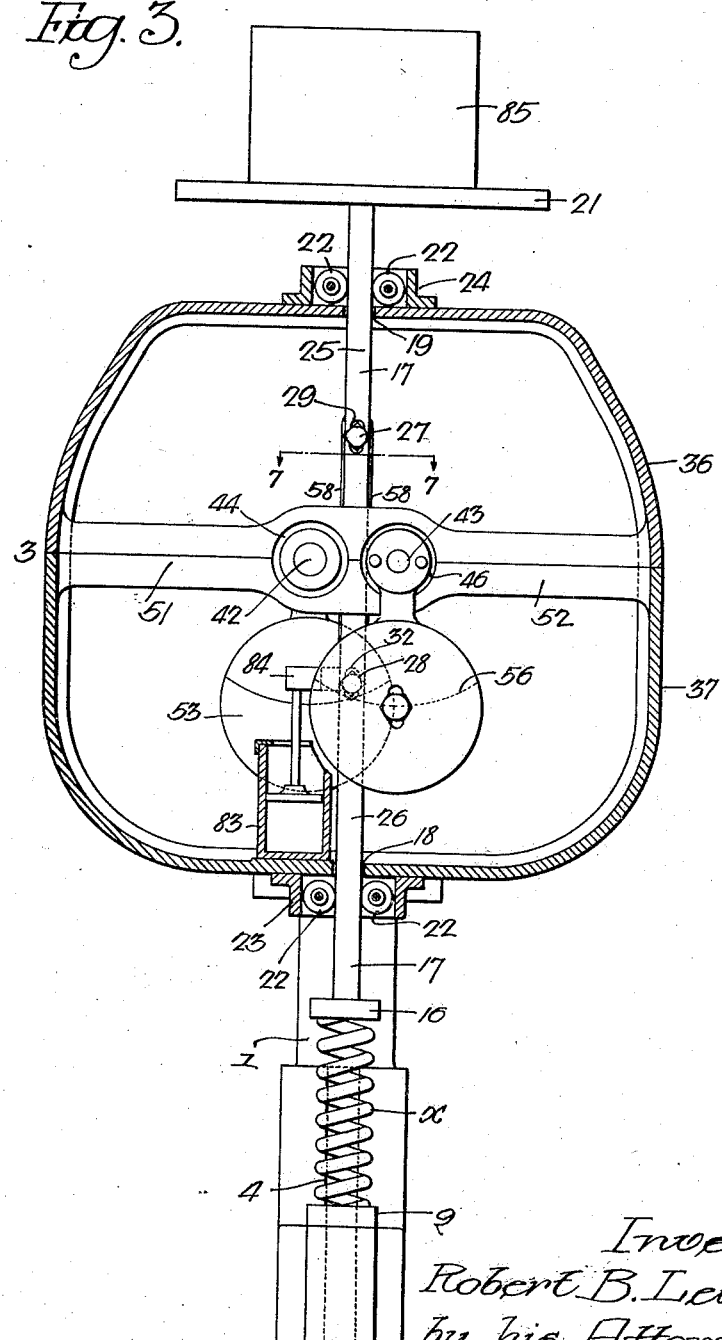
Fig. 3 is a vertical section on the line 3—3 of Fig. 4.

The casing 3 (Fig. 3) may be formed of upper and lower sections 36 and 37 defining a rear end 38 and a front end 39, the latter being provided with a dial 41, as will appear more fully hereinafter.

A pair of spindles 42 and 43, which are positioned on opposite sides of the plunger 17 intermediate the shoulders 34 and 35 and which extend between the front and rear ends 38 and 39 of the casing 3, are revolubly mounted in spaced bearings 44—45 and 46—47, respectively. While I have shown a special form of anti-friction bearing in the drawing, it is apparent that my invention is not necessarily limited thereby, inasmuch as other forms of bearings are also applicable.

The bearings 44—46 and 45—47 may be supported by spaced bearing supports 48 and 49, respectively, (Fig. 4) which are carried by arms 51 and 52 extending inwardly from the inner surface of the casing 3. For purposes of convenience in assembling, the bearings as well as the supporting structure just described is preferably horizontally divided so that one-half may be carried by the lower section 37 and the other half by the upper section 36.

The rear end of one spindle 42 is provided with a weighted depending member 53 constituting a pendulum. In order that the operating characteristics of the pendulum may be varied, an auxiliary weight 54 is adjustably secured to the lower end of the member 53 by means of a clamping screw member 55. Similarly, the front end of the other spindle 43 is provided with a pendulum 56 having an adjustable portion 57.

In order that the pendulums 56 and 53 may be actuated in accordance with the movement of the plunger 17 while acting under loads of compression or tension, I provide a form of flexible connection 58. The flexible connection 58 includes a steel ribbon or other form of flexible cable 59 (Fig. 6), which extends from a clamping block 60 on the outer periphery of the spindle 42 around an upper side 61 thereof, thence down around the lower shoulder 34 passing up and around an upper side 62 of the spindle 43 and terminating in a clamping block 63. When the plunger 17 is moved downwardly, as when measuring a tension load, the corresponding downward movement of the flexible cable 59 causes the spindles 42 and 43 to rotate, thereby actuating the pendulums 56 and 53 apart so as to resist said tension load with an increasing force.

In order that the testing machine embodying my invention may respond to compressive or positive forces, such, for instance, as those obtaining upon a vertical movement of the platen 9, I provide an additional flexible cable 64 (Figs. 6 and 4) which is oppositely positioned with respect to the cable 59.

The flexible cable 64 may extend from the clamping block 63 on the outer periphery of the spindle 43 around a lower side 66 thereof, thence up around the upper shoulder 35, passing down and around an under side 67 of the spindle 42 and terminating in the clamping block 60. When the plunger 17 is moved vertically upwardly in accordance with a compressive force on the platen 16 which is secured to the lower end thereof, the spindles 42 and 43 are so moved as to actuate the pendulums 56 and 53 toward each other, whereby an increasing retarding force may be exerted as the plunger 17 continues to move upwardly. Thus it can be seen that the testing machine embodying my invention may be adapted to respond to compressive as well as tension forces.

The flexible cables 59 and 64 serve to lock the plunger 17 to the spindles 42 and 43, so that a movement of the plunger 17 in response to loads of compression or tension is simultaneously transmitted to the spindles 42 and 43, resulting in a corresponding actuation of the pendulums 56 and 53 from the neutral position shown in the drawing. If the cables 59 and 64 should become slack, this may be absorbed by loosening the bolts 27 and 28 sufficiently to permit an increase in the spacing of shoulders 34 and 35 of the plunger sections 25 and 26, respectively.

My invention further contemplates a testing machine, wherein the dial 41 is provided with uniformly spaced graduations. Such desired result requires the provision of a special mechanical connection 69 between the weighing pendulums 53 and 56 and an indicating pointer 71, whereby the horizontal displacement of the pendulums 53 and 56 may be translated into a uniform movement of the pointer 71. To this end, I provide a pair of racks 72 and 73 (Fig. 8) which are mounted for vertical movement on spaced supporting members 74 and 75. The racks 72 and 73 mesh with a pinion 76 which provides a mounting for the pointer 71, so that a movement of the rack 73 may cause the pointer 71 to move over the dial 41 the desired extent.

The rack 73 may be operatively associated with the pendulums 53 and 56 by a so-called "Scotch cross-head" 77 which involves the use of spaced pins 78 and 79 mounted on the front end of the spindle 43 together with a cooperating bracket member 81 extending from the movable rack 73. In such construction, actuation of the spindles 42 and 43 in response to movements of the load-responsive plunger 17 causes the pin 78 to engage the bracket 81, thereby causing a vertically downward movement of the rack 73 and a corresponding rotative movement of the pointer 71 over the face of the dial 41. A force may be normally exerted on the rack 72 in order to avoid back-lash in the operation of the pointer 71 by a weight 82 which is secured to the lower end thereof.

Experience has shown that the operation of the weighing apparatus described above may be made more uniform by providing a dash pot 83 which is mechanically associated with an arm 84 of the load-responsive plunger 17.

Figure 2:
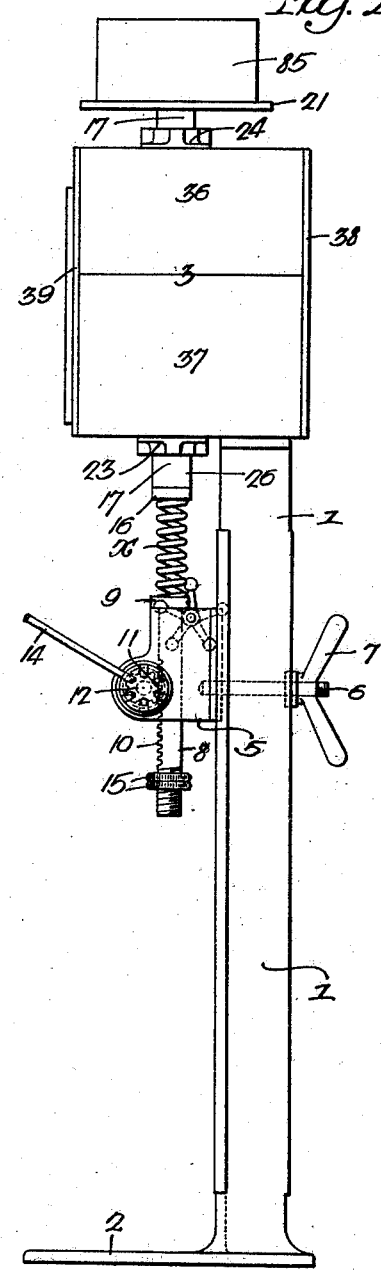

Assuming the testing machine embodying my invention arranged for the measurement of the compressive strength of the spring $x$, as shown in Figs. 1 and 2 of the drawing, a downward movement of the operating bar 14 causes an upward movement of the platen 9, thereby compressing the spring $x$ inasmuch as movement of the upper platen 16 is resisted by force of the pendulums 53 and 56. The resulting movement of the spindles 42 and 43 causes an actuation of the pointer 71 over the face of the dial 41 to an extent dependent upon the force applied to the test specimen $x$.

Should it be desirable to increase the capacity of the machine so as to measure relatively large compressive forces, a known weight 85 may be mounted on the weight supporting platen 21.

When testing the spring $x$ for tensile strength, the upper and lower platens 16 and 9 are so modified as to rigidly grip the ends of the test spring $x$, as shown in Fig. 4. An upward movement of the operating bar 14 then establishes a tension or negative load in the spring $x$ which results in a swinging apart of the pendulums 53 and 56 until the tension load on the plunger 17 is balanced. The resulting movement of the spindles 42 and 43 causes an actuation of the pointer 71 over the dial 41 in the same direction as that caused by the compression load.

While I have shown and described a particular form of embodiment of my invention, for the purpose of illustrating the principles of construction and operation thereof, it is apparent that various changes and modifications may be made therein without departing from the spirit of my invention, as, for instance, the operation of the cross-head 5 by means of a motor rather than by the hand means shown in the drawing. I desire, therefore, that only such limitations shall be imposed thereon as are indicated in the appended claims or as are demanded by the prior art.

I claim:

1. A testing machine comprising a pendulum, load-receiving means, and means for so operatively associating said pendulum and said first-mentioned means that said machine registers a compression load and a tension load for opposite movements of said load receiving means.

2. In combination, weighing mechanism, indicating means, means for so operatively associating said first-mentioned means and said mechanism that the operation of the latter causes a uniform movement of the former, load-receiving means, and means for operatively associating said mechanism and said load-receiving means, whereby said indicating means will respond to compression and tension loads.

3. In combination, a pendulum, means responsive to loads of compression and tension for actuating said pendulum, an indicating element, and means for operatively associating said pendulum and said indicating element, whereby the horizontal displacement of the former may be translated into a uniform movement in the latter.

4. A testing machine comprising a pendulum, means for actuating said pendulum in response to forces of opposite sign, an indicating element, and means for operatively associating said pendulum and said indicating element, whereby the latter may be actuated in the same direction regardless of the sign of said force.

5. In a testing machine, the combination with a pendulum, of a load-receiving member, and means including a flexible element for substantially directly interlocking said pendulum and said member so that the operation of the latter in opposite directions causes a movement of the former.

6. In combination, a load-responsive element, a pair of weighted spindles, and flexible means so mechanically associated with said spindles and said element as to cause the operation of the former for a positive or negative application of load to the latter.

7. In combination, a movable element provided with spaced shoulders, a pair of weighted spindles, and a pair of flexible cables respectively passing over said shoulders, corresponding ends of said cables being respectively secured to said weighted spindles, whereby a movement of said element in either direction may be resisted by said spindles.

8. In combination, a movable element provided with spaced shoulders, a pair of weighted spindles, and a pair of flexible cables respectively passing over said shoulders, the ends of one of said cables being wound on corresponding sides of said spindles and secured in position, the ends of the other of said cables being oppositely wound.

9. A testing machine comprising a pair of horizontally extending weighted spindles, a vertically movable plunger provided with upper and lower shoulders, flexible cables respectively passing over said shoulders and opposite sides of said spindles, and indicating means operatively associated with said spindles.

10. In combination, a pair of weighted spindles, a movable plunger provided with spaced shoulders, a flexible cable having the ends thereof wound around corresponding sides of said spindles, respectively, an intermediate portion of said cable passing over one of said shoulders, and a second cable passing over the other of said shoulders, the ends of said second cable being respectively wound around portions of said weighted spindles opposite to that embraced by said first-mentioned cable.

11. In combination, an axially extensible plunger provided with spaced shoulders, a pair of weighted spindles, and flexible cables respectively passing over said shoulders, the ends of one of said cables passing around corresponding sides of said weighted spindles, respectively, and secured in position, the ends of the other of said cables passing around opposite sides of said spindles, respectively, and secured in position.

12. In a testing machine, the combination with a pair of weighted spindles, of a movable plunger responsive to forces of opposite sign, means for so mechanically associating said plunger and said spindles as to cause the latter to move in accordance with the former, and means whereby the capacity of said machine, may be increased for compression.

13. In a testing machine, a pair of weighted spindles, a movable plunger responsive to forces of opposite sign, means for operatively associating said plunger and said spindles so that movements of the former are transmitted to the latter, a movable weight mounted on one end of said plunger, and means for applying a force to the other end of said plunger.

14. A testing machine including a pair of pendulums, supporting spindles therefor, a load responsive plunger, and means for so operatively associating said spindles and said plunger that a motion of the latter in either direction from a neutral position is transmitted to the former.

15. A testing machine including a pair of pendulums, supporting spindles therefor, a load responsive plunger, and means for so operatively associating said spindles and said plunger that a motion of the latter in either direction is transmitted to the former, said plunger being extensible so as to avoid slack in said means.

16. Apparatus comprising a pair of pendulums, spindles for respectively supporting the same, a load responsive plunger, flexible cables for so operatively associating said plunger and said spindles that motion of the former in either direction is transmitted to the latter, and indicating means operatively associated with one of said spindles.

17. In combination, a pair of elements provided with overlapping end portions adjustably secured together to constitute a load-responsive plunger, a pair of weighted spindles, and a pair of flexible cables respectively passing over the ends of said elements and wound around said spindles in such manner that the latter respond to opposite movements of said plunger.

18. In combination, a load-responsive plunger comprising over-lapping sections providing spaced shoulders, a plurality of pendulums, a plurality of spindles for respectively supporting the same, flexible cables respectively passing over said shoulders and around said spindles, whereby said spindles may respond to opposite movements of said plunger, means for applying a force to one end of said plunger, and means for indicating the movement of said pendulums in response to said force.

19. In combination, a casing comprising upper and lower sections, the latter being provided with an opening, a load-responsive plunger extending through said opening into said casing, a pair of pendulums, a pair of spindles for respectively supporting said pendulums, bearings provided by said casing for said spindles, means for operatively associating said plunger and said spindles, whereby the latter may respond to opposite movements of the former, and indicating means having an operative connection with said spindles.

20. In a testing machine, the combination with a vertically movable plunger, of a plurality of pendulums, means for so mechanically associating said plunger and said pendulums that the latter respond to opposite movements of the former, and a vertically movable cross-head constituting one abutment for the means to be tested, said plunger constituting the other abutment.

21. In combination, a pinion having an indicating element secured thereto, a pair of cooperating racks positioned on opposite sides of said pinion, means for movably supporting said racks, actuating means associated with one of said racks, and gravity operated means for exerting a force on the other of said racks to avoid back-lash.

22. A machine comprising a pair of weighted spindles, a member adapted to receive the force of the specimen under test and also a variable load permitting adjustments in the capacity of the machine, and means including a flexible element for operatively associating said spindles and said member.

23. In a testing machine, a pair of weighted spindles, a member adapted to receive the force of the specimen under test and also a variable load permitting adjustments in the capacity of the machine, means including a flexible element operatively associating said spindles and said member, and indicating means connected to be actuated by one of said spindles.

24. In a testing machine, the combination with a weighted spindle, of a member adapted to receive the force of the specimen and also an adjustable load permitting variations in the capacity of the machine, and means including a flexible element for operatively associating said member and said spindle.

25. In a testing machine, a weighted spindle, a member adapted to receive opposing loads at spaced points, one of said loads being adjustable to vary the capacity of the machine, means including a flexible element for operatively associating said member and said spindle, and means for indicating the movement of said spindle.

26. In a testing machine, the combination with a pair of pendulums, of a plunger, one end of which is adapted to engage a specimen and the other end a removable weight permitting adjustments in the capacity of the machine, and flexible means for operatively associating said pendulums and said plunger.

27. A machine of the class described comprising an enclosing casing, a load-receiving plunger extending through said casing, one end of said plunger constituting a support for a removable weight, whereby the capacity of the machine may be varied, the other end being adapted to engage a specimen.

28. In a testing machine, weighing mechanism, a casing therefor, a load-receiving plunger operatively associated with said mechanism, anti-friction guiding means for said plunger, and means whereby the movement of the plunger due to the force of the specimen under test may be varied to control the capacity of the machine.

29. A testing machine comprising a casing for weighing mechanism, a plunger, the ends of which extend through said casing and respectively terminate in a specimen-engaging portion and a platform for a removable weight.

30. In a testing machine, a sectional casing, a load-responsive plunger having portions accessible from the outside of said casing, a pair of pendulums, and means for operatively associating said pendulums and said plunger, one of said portions being adapted to receive the force of the test specimen, the other of said portions being adapted to receive an adjustable opposing force permitting variations in the capacity of the machine.

ROBERT B. LEWIS.